United States Patent

Yamamoto et al.

[11] Patent Number: 5,680,896
[45] Date of Patent: Oct. 28, 1997

[54] METHOD FOR PRODUCTION OF RARE EARTH METAL-NICKEL HYDROGEN OCCLUSIVE ALLOY INGOT

[75] Inventors: Kazuhiko Yamamoto, Kobe; Yuichi Miyake, Kasai; Chikara Okada, Kobe; Nobuyuki Kitazume, Himeji, all of Japan

[73] Assignee: Santoku Metal Industry Co., Ltd., Hyogo-ken, Japan

[21] Appl. No.: 417,934

[22] Filed: Apr. 6, 1995

Related U.S. Application Data

[62] Division of Ser. No. 63,895, May 17, 1993, Pat. No. 5,470,404.

[30] Foreign Application Priority Data

May 21, 1992 [JP] Japan .................. 4-128937

[51] Int. Cl.⁶ ...................... B22D 11/22
[52] U.S. Cl. .............. 164/479; 164/480; 148/555; 148/538; 420/416; 420/443
[58] Field of Search .......... 420/900, 590, 420/416, 443; 148/538, 555; 164/485, 428–429, 480, 479, 482; D/1, 6

[56] References Cited

U.S. PATENT DOCUMENTS

| | | | |
|---|---|---|---|
| 4,565,686 | 1/1986 | Kumar | 420/900 |
| 4,717,629 | 1/1988 | Ishikawa et al. | 420/900 |
| 5,008,164 | 4/1991 | Furukawa et al. | 420/900 |
| 5,074,935 | 12/1991 | Masumoto et al. | 420/590 |
| 5,213,148 | 5/1993 | Masumoto et al. | 420/590 |
| 5,219,678 | 6/1993 | Hasebe et al. | 429/223 |
| 5,470,404 | 11/1995 | Yamamoto et al. | 420/900 |

FOREIGN PATENT DOCUMENTS

| | | | |
|---|---|---|---|
| 1001453 | 11/1976 | Canada | 420/900 |
| 60-083749 | 5/1985 | Japan | 164/479 |

*Primary Examiner*—David A. Simmons
*Assistant Examiner*—Margery S. Phipps
*Attorney, Agent, or Firm*—Darby & Darby

[57] ABSTRACT

A method for producing rare earth metal-nickel hydrogen occlusive alloy ingot that contains 90 vol % or more of crystals having a crystal grain size of 1 to 50 μm as measured along a short axis of the crystal and 1 to 100 μm as measured along a long axis of the crystal. The method for producing the rare earth metal-nickel hydrogen occlusive alloy ingot involves melting a rare earth metal-nickel alloy and uniformly solidifying the alloy melt to have a thickness of 0.1 to 20 mm under cooling conditions of a cooling rate of 10° to 1000° C./sec and a sub-cooling degree of 10° to 500° C.

5 Claims, 2 Drawing Sheets

METHOD FOR PRODUCTION OF RARE EARTH METAL-NICKEL HYDROGEN OCCLUSIVE ALLOY INGOT

This is a division of application Ser. No. 08/063,895, filed May 17, 1993 now U.S. Pat. No. 5,470,404.

BACKGROUND OF THE INVENTION

This invention relates to a rare earth metal-nickel hydrogen occlusive alloy ingot having crystalline structures excellent in hydrogen storage and a method for producing same.

Up to now, a hydrogen occlusive alloy ingot is prepared by a metal mold casting method of casting a molten alloy into a metal mold. On the other hand, a variety of additive elements such as cobalt, manganese or aluminum are usually added to the alloy for improving its characteristics such as hydrogen occluding characteristics. However,. if the molten alloy is to be solidified by the metal mold casting method, the heat conduction through the casting mold determines the rate of heat removal during an initial stage of a heat removal process of the molten alloy. As solidification proceeds, the heat conduction between the casting mold and the solidifying phase or in the solidifying phase determines the rate of heat conduction. Even though the cooling capacity of the metal mold is increased, the inner portions of the ingot and those portions thereof in the vicinity of the casting mold are subjected to different cooling conditions. Such phenomenon is the mope pronounced, the thicker the ingot thickness. The result is that in the case of a larger difference between the cooling conditions in the inner portions of the ingot and those in the vicinity of the ingot surface, microscopic segregation of additive elements, above all, is likely to occur. Besides, a homogenizing heat treatment process needs to be carried out for a prolonged period of time for homogenizing the crystal composition.

On the other hand, the ingot is usually pulverized to a size of an order of tens of microns during the pulverization step in the course of the process for preparation of hydrogen occlusive alloy powders. However, the ingot produced by the metal mold casting method contains a phase rich in additive elements having a larger particle size and hence presenting difficulties in pulverization. Consequently, the particle size of the powders from the pulverization process becomes non-uniform to adversely affect hydrogen occlusive characteristics, thus rendering it impossible to obtain unobjectionable hydrogen occlusive characteristics of the ultimate hydrogen occlusive alloy powders.

SUMMARY OF THE INVENTION

It is an object of the present invention to provide a hydrogen occlusive alloy ingot having a crystalline structure favorably influencing the characteristics of hydrogen occlusive alloy powders prepared therefrom and which is particularly useful as a material for an electrode of a nickel hydrogen secondary cell, and a method for producing such alloy ingot.

According to the present invention, there is provided a rare earth metal-nickel hydrogen occlusive alloy ingot comprising 90 vol % or more of crystals having a crystal grain size of 1 to 50 µm as measured along a short axis of the crystal and 1 to 100 µm as measured along a long axis of the crystal.

According to the present invention, there is also provided a method for producing the aforementioned rare earth metal-nickel hydrogen occlusive alloy ingot comprising melting a rare earth metal-nickel alloy and uniformly solidifying the alloy melt to have a thickness of 0.1 to 20 mm under cooling conditions of a cooling rate of 10° to 1000° C./sec and a sub-cooling degree of 10° to 500° C.

DESCRIPTION OF THE PREFERRED EMBODIMENTS

Figure 1:
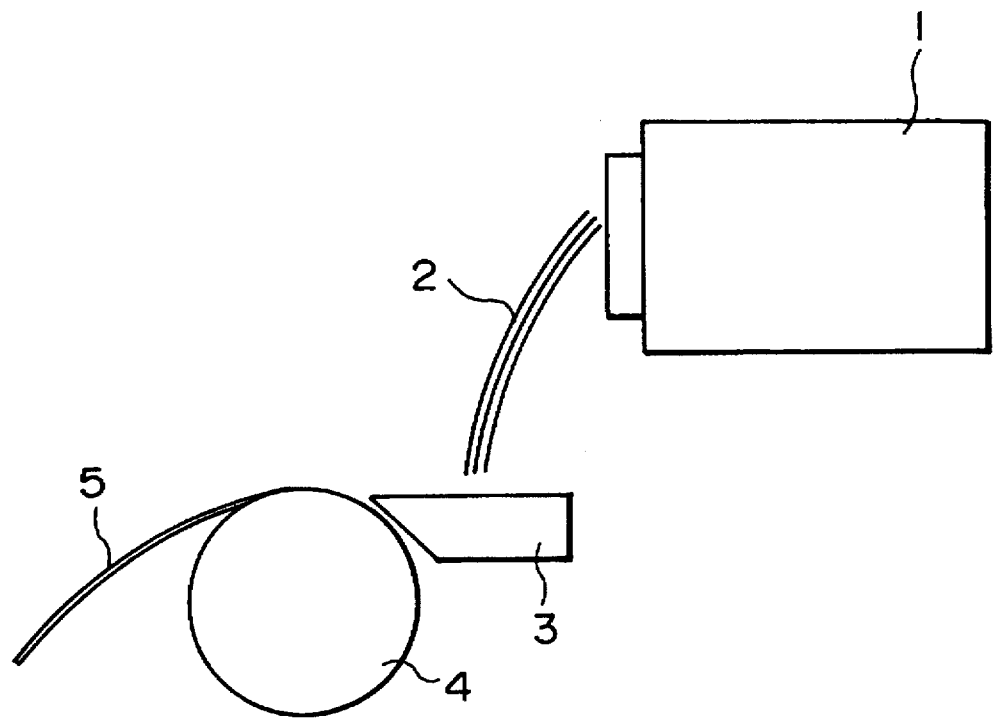
FIG. 1 is a schematic view illustrating the manufacture of a hydrogen occlusive alloy ingot by a strip casting method employed in Example 1.

The present invention will be explained further in detail hereinbelow.

The hydrogen occlusive alloy ingot according to the present invention is a rare earth metal-nickel alloy ingot containing 90 vol. % or more and preferably 95 vol % or more of crystals having a crystal grain size as measured along the short axis of 1 to 50 µm and a crystal grain size as measured along the long axis of 1 to 100 µm. It is particularly desirable that segregation of constituent elements in main phase crystal grains be less than 5 wt % and the distance between regions of cellular segregation based on dendritic crystal growth be 1 to 40 µm. If the content of the crystals having the above-specified crystal grain size is less than 90 vol %, it is not possible to give superior hydrogen occlusive characteristics to the produced alloy ingot. On the other hand, if the crystal grain size is outside the above-specified range, the grain size distribution becomes non-uniform. If the amount of the segregation of constituent elements exceeds 5 wt % or if the distance between the regions of cellular segregation based on dentric crystal growth exceeds 40 µm, the particle size distribution may become undesirably non-uniform at the time of pulverization during the process of preparation of the hydrogen occlusive alloy powders. The thickness of the hydrogen occlusive alloy ingot is preferably 0.1 to 20 mm. The thickness in excess of 20 mm is not desirable in that difficulties are incurred in the method of preparation of the alloy ingot, as later described, for producing the desired crystal structure.

There is no particular limitation to the components of a starting material for preparation of the hydrogen occlusive alloy ingot of the present invention, provided that the starting material is a rare earth metal-nickel based material. Examples of the rare earth metals include scandium, yttrium, lanthanum, cerium, praseodymium, neodymium, promethium, samarium, curopium, gadolinium, terbium, dysporosium, holmium, ytterbium, or mixtures thereof. The starting material may also contain other components such as Mn, Co, Al, etc. The proportion of the rare earth metals to nickel is preferably 35:65 to 30:70 by weight. The aforementioned other components may be contained in an amount of 1 to 46 parts by weight to 100 parts by weight of the rare earth metal and nickel added together.

The method for preparing the alloy ingot according to the present invention is produced by homogeneously solidifying the rare earth-nickel based alloy melt under cooling conditions of a cooling rate of 10° to 1000° C./sec. preferably 500° to 1000° C./sec and a sub-cooling degree of 10° to 500°, preferably 100° to 500° C.

The sub-cooling degree herein means a value of (melting point of the alloy)−(actual temperature of the alloy melt) which is correlated with the cooling rate. If the cooling rate and the sub-cooling degree are outside the above-mentioned ranges, the alloy ingot having the desired structure cannot be produced.

Specifically, according to the present invention, the hydrogen occlusive alloy ingot having the desired crystalline structure may be produced by e.g. a strip casting method consisting in melting a rare earth metal-nickel based alloy in an inert gas atmosphere, preferably using a crucible, by e.g. a vacuum melting method or a high frequency melting method, and solidifying the resulting molten alloy on e.g. a single roll, a twin roll or a disc, preferably continuously under the aforementioned conditions. If the molten alloy is to be solidified by the strip casting method, the casting temperature and the rate of alloy melt injection are suitably selected within the above-specified ranges so that the ultimate thickness of the alloy ingot is in a range of 0.1 to 20 mm.

The hydrogen occlusive alloy ingot of the present invention may be processed into hydrogen occlusive alloy powders by the steps of ordinary crushing, heat treatment and pulverization.

The hydrogen occlusive alloy ingot of the rare earth metal-nickel of the present invention, containing the specified amounts of crystals having a crystal size as measured along the short crystal axis of 1 to 50 μm and a crystal size as measure along the long crystal axis of 1 to 100 μm, in a uniformly and finely dispersed state, is superior in heat treatment characteristics and pulverizability, and may be advantageously employed as a starting material for a hydrogen occlusive alloy powder having excellent hydrogen occlusive characteristics, above all, as a material for an electrode of a nickel-hydrogen secondary cell. Besides, the cell produced from the material for a cell electrode has superior characteristics as a cell such as high initial charging rate, a longer cell life or a larger electrical capacity. In addition, it is possible with the method of the present invention to produce a hydrogen occlusive alloy ingot having highly uniform composition and structure using the specified cooling rate and the specified sub-cooling degree.

EXAMPLES OF THE INVENTION

The present invention will be explained in detail with reference to an Example and a Comparative Example. It is noted that these Examples are given for the sake of illustration only and are not intended for limiting the invention.

Example 1

1 kg of an alloy represented by the following formula I

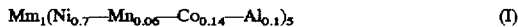

$$Mm_1(Ni_{0.7}-Mn_{0.06}-Co_{0.14}-Al_{0.1})_5 \quad (I)$$

was melted by the high frequency melting method in an argon atmosphere, using an alumina crucible to produce a molten alloy. After the produced molten alloy was maintained at a temperature of 1400° C., it was processed by a device shown in FIG. 1 in accordance with the following method to produce a hydrogen occlusive alloy ingot. The results of analysis of the structure of the produced alloy ingot are shown in Table 1.

FIG. 1 schematically shows a device for preparing a hydrogen occlusive alloy ingot by the strip casting method using a single roll. An alloy melt 2 obtained by the high frequency melting method was contained in a crucible 1. The alloy melt 2 maintained at 1400° C. was continuously injected onto a tundish 3 and allowed to be quenched and solidified on a roll 4 rotated at a rate of approximately 1 m/sec under the cooing conditions of the cooling rate of 500° C./sec and the sub-cooling degree of 200° C. The melted mass was caused to descend continuously in the rotating direction of the roll 4, as it was being solidified, to produce an alloy ingot 5 having a thickness of 0.5 mm.

The produced hydrogen occlusive alloy ingot was pulverized to have a particle size of not more than 500 μm, using a planetary ball mill to produce hydrogen occlusive alloy powders. The hydrogen occlusive characteristics of the produced powders at 40° C. were measured using a PCT measuring device based on Sievelt's method. The results are shown in Table 2 nd FIG. 2.

Figure 3:
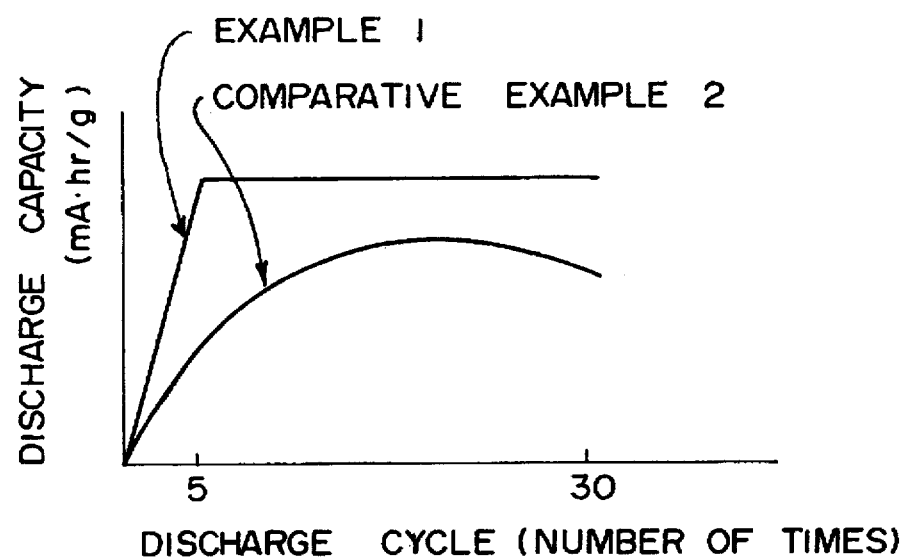
FIG. 3 is a graph showing the results of measurement of electrode characteristics of the hydrogen occlusive alloys prepared in Example 1 and Comparative Example 1.

The above powders were further pulverized to have a particle size of 80 μm, using a planetary ball mill. 10 g of the resulting powders, 1 g of an electrically conductive agent (copper powders) and 0.3 g of powders of an ethylene tetrafluoride-propylene hexafluoride copolymer (FEP powers) were mixed together to produce a pellet electrode having a diameter of 20 mm. A cell was produced by the above electrode dipped in a 6N KOH solution and a reference electrode of mercury oxide, and electrode characteristics were measured using a potentio-galvanostat. The results are shown in Table 3 and FIG. 3.

Figure 4:
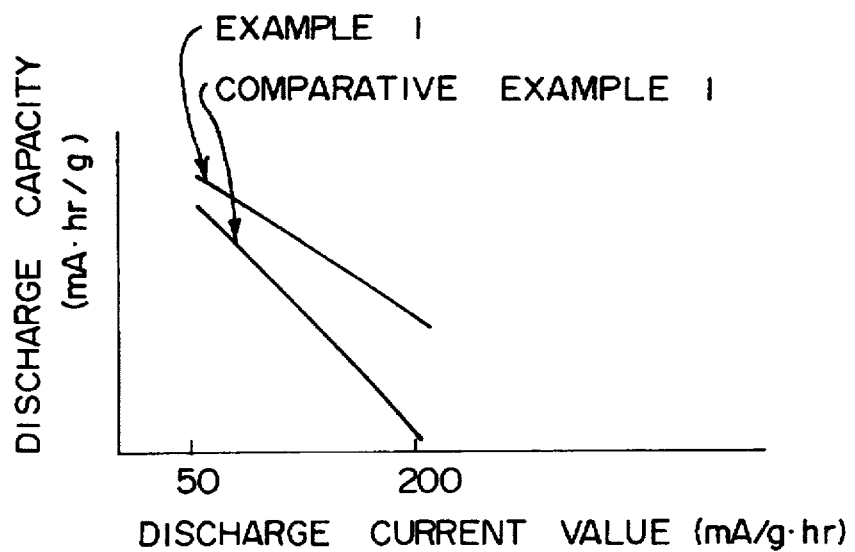
FIG. 4 is a graph showing the results of measurement of cell characteristics of the hydrogen occlusive alloys prepared in Example 1 and Comparative Example 1.

On the other hand, a negative electrode of a hydrogen occlusive alloy was prepared using 10 g of the above powders pulverized to have a particle size of 80 μm and 0.3 g of a polytetrafluoroethylene as a binder. The negative electrode thus prepared was dipped in a 6N KOH solution in combination with a positive nickel hydroxide electrode for constituting a cell in conjunction with a mercury oxide reference electrode. Cell characteristics were measured using a potentio-galvanostat. The results are shown in Table 4 and FIG. 4.

Comparative Example 1

The alloy melt prepared in Example 1 was pulverized in the same way as in Example 1 except using a hydrogen occlusive alloy ingot, 30 mm in thickness, produced by the metal mold casting method at a cooling rate of 5° C./sec and a sub-cooling degree of 20° C. The various characteristics as measured of the produced powders are shown in Tables 1 to 4 and in FIGS. 2 to 4.

TABLE 1

| | Main Phase Grain Size (Mean Value) (μm) | | Main Phase Ratio (Vol %) | Distance Between Cellular Segregation Regions (μm) |
|---|---|---|---|---|
| Ex.1 | Short Axis | 1–20 (5) | 93 | 3 |
| | Long Axis | 1–300 (100) | | |
| Comp. Ex.1 | Short Axis | 100–300 (150) | 65 | 150 |
| | Long Axis | 100–500 (350) | | |

TABLE 2

| Ex./Comp.Ex. | Hydrogen Occlusion (10 atm) | Equilibrium Pressure H/M = 0.5 |
|---|---|---|
| Ex.1 | 0.9 | 0.5 |
| Comp.Ex.1 | 0.7 | 0.8 |

TABLE 3

| | Discharge Capacity (mA hr/g) | |
|---|---|---|
| Charge/Discharge Cycle | 5 | 30 |
| Ex.1 | 200 | 200 |
| Comp.Ex.1 | 100 | 150 |

TABLE 4

| | Discharge Capacity (mA hr/g) | |
|---|---|---|
| Discharge Current (mA/g hr) | 50 | 200 |
| Ex.1 | 240 | 150 |
| Comp.Ex.1 | 200 | 20 |

Figure 2:
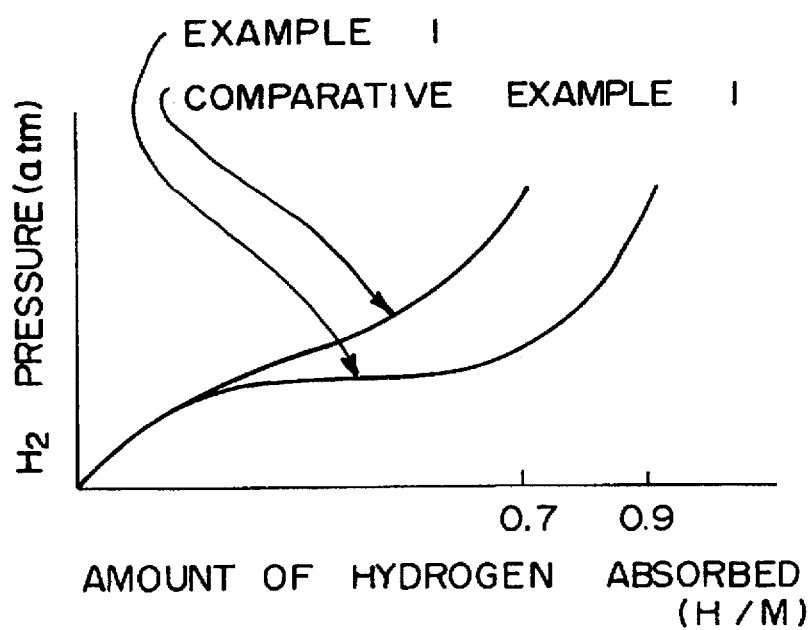
FIG. 2 is a graph showing the results of measurement of the hydrogen occlusive characteristics of the hydrogen occlusive alloys prepared in Example 1 and Comparative Example 1.

It is seen from FIG. 2 that, with the hydrogen occlusive alloy ingot of the present invention, the amount of hydrogen absorped is increased, while a plateau area is broader and an equilibrium pressure is lowered as compared to that of the conventional product. It is also seen from FIGS. 3 and 4 that the discharge capacity and deterioration are lowered and hence the electrode has superior electrode characteristics and cell characteristics.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for producing the rare earth metal-nickel hydrogen occlusive alloy ingot having a crystalline structure comprising 90 vol % or more of crystals having a crystal grain size of 1 to 50 µm, as measured along a short axis of said crystal and 1 to 100 µm as measured along a long axis of said crystal, said method comprising providing a rare earth metal-nickel alloy consisting essentially of rare earth metal and nickel in a proportion ranging from 35:65 to 30:70 by weight, melting the rare earth metal-nickel alloy to form an alloy melt and uniformly solidifying the alloy melt by quenching the alloy melt to a temperature 10° to 500° C. below the melting point of said alloy at a cooling rate of 10° to 1000° C./sec. to form an alloy ingot having a crystalline structure with a thickness ranging between 0.1 to 20 mm.

2. The method as claimed in claim 1 wherein segregation of constituent elements in main phase crystal grains of said alloy ingot is less than 5 wt % and a distance between regions of cellular segregation based on dentritic crystal growth is 1 to 40 µm.

3. The method as claimed claim 1 wherein the alloy ingot contains a rare earth metal selected from the group consisting of scandium, yttrium, lanthanum, cerium, praseodymium, neodymium, promethium, samarium, europium, gadolinium, terbium, dysprosium, holmium, ytterbium, and mixtures thereof.

4. The method as claimed in claim 1 wherein the alloy ingot further contains a component selected from the group consisting of manganese, cobalt, aluminum, and mixtures thereof.

5. The method as claimed in claim 4 wherein said component is contained in an amount of 1 to 45 parts by weight to 100 parts by weight of the rare earth metal and the nickel added together.

* * * * *